(12) United States Patent
Pearson et al.

(10) Patent No.: US 8,015,671 B2
(45) Date of Patent: Sep. 13, 2011

(54) STRAP WITH ENHANCED STIFFNESS

(75) Inventors: Timothy B. Pearson, Antioch, IL (US); Wayne J. Thas, Arlington Heights, IL (US); Manuel C. Enriquez, Morton Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 451 days.

(21) Appl. No.: 11/680,352

(22) Filed: Feb. 28, 2007

(65) Prior Publication Data

US 2008/0201911 A1 Aug. 28, 2008

(51) Int. Cl.
*A44B 99/00* (2010.01)

(52) U.S. Cl. ............ 24/1; 24/16 PB; 24/17 AP; 428/221

(58) Field of Classification Search .................. None
See application file for complete search history.

(56) References Cited

U.S. PATENT DOCUMENTS

| | | | |
|---|---|---|---|
| 3,066,366 A | 12/1962 | Wyckoff et al. | |
| 3,104,937 A | 9/1963 | Wyckoff et al. | |
| 3,514,815 A * | 6/1970 | Evans | 24/16 R |
| 3,746,608 A | 7/1973 | Takahashi | |
| 4,152,475 A | 5/1979 | Haley | |
| 4,388,991 A | 6/1983 | Price | |
| 4,872,242 A * | 10/1989 | Allan | 24/16 PB |
| 5,121,524 A | 6/1992 | Mortensen | |
| 5,232,777 A * | 8/1993 | Sipinen et al. | 428/364 |
| 6,210,769 B1 | 4/2001 | DiPede et al. | |
| 6,438,807 B1 | 8/2002 | Ptolemy | |
| 6,938,305 B2 * | 9/2005 | Garver | 24/16 PB |
| 2005/0082147 A1 | 4/2005 | Mol | |
| 2005/0278901 A1 | 12/2005 | Huang | |

FOREIGN PATENT DOCUMENTS

GB 891829 A 3/1962

OTHER PUBLICATIONS

International Search Report and the Written Opinion of the International Searching Authority issued on Jul. 28, 2008, in connection with PCT/US2008/053718.

* cited by examiner

*Primary Examiner* — Jack W. Lavinder
(74) *Attorney, Agent, or Firm* — Levenfield Pearlstein, LLC

(57) ABSTRACT

A plastic strap particularly useful for automated strapping machines is formed with an integrated, longitudinally disposed rib for enhancing the stiffness of the strap. The strap is formed with at least one rib extending longitudinally from a first end of the strap to a second end of the strap. The rib preferably extends upwardly from the top surface of the strap and comprises, preferably, a slight arcuate profile. The profile of the rib, the number of ribs, and the location of the ribs on the strap may vary depending upon the desired longitudinal stiffness of the strap and the desired width and thickness of the strap. The ribs may be centered across the width the strap or offset. The strap further comprises side panels that are parallel to the longitudinal plane of the strap and outer edges that are generally perpendicular to the longitudinal plane of the strap. The geometry of the strap prevents the strap from twisting and permits overlapping sections of the strap to interlock and self-align during sealing. The rib is formed by passing the heated strap through a rolling mechanism configured to form the desired rib profile in the strap while exerting compressive forces on the side panels of the strap.

20 Claims, 3 Drawing Sheets

STRAP WITH ENHANCED STIFFNESS

BACKGROUND OF THE INVENTION

The present invention relates to strapping material. More particularly, the present invention concerns a plastic strap formed with an integrated rib for enhancing the stiffness of the strap. Such a strap is particularly useful for automated strapping machines (or "strappers").

Strapping machines are in widespread use for securing thin bands of plastic strap around loads. One type of known strapper includes a strapping head and drive mechanism mounted within a frame. Mounted to the frame is a chute through which strapping material is fed. Means generally are provided in the chute for guiding and retaining the strap in the chute so that the strap cannot fall or be pulled inwardly against the load until after a loop of strap has been formed around the load. Such means usually include a strap release system that permits the strap to be released from the chute upon tensioning.

Typically, the chute is larger than the load to be strapped so as to accommodate various load sizes and, thus, such strap guiding and retaining means function to initially maintain the strap in the largest possible loop configuration and, of course, function to permit the strap to be fed around the load without impinging upon or snagging upon the load. Moreover, the chute typically is constructed in a shape and size suitable to surround the load to be strapped, and generally is constructed in a quadrilateral shape, such as a square or a rectangle, with four corners, since most loads to be strapped share the same shape.

Prior art chute designs generally employ modular chute components, which are assembled to form the desired chute size and shape. For square and rectangular chutes, the chutes generally are comprised of horizontal and vertical chute sections, which often are supported by support beams, and connected by four corner assemblies. The chute typically is enclosed by a strap retaining and release means of the type well known in the prior art.

In a typical stationary bottom-seal strapper, the chute is mounted at about a work surface, and the strapping head is mounted to a horizontal portion of the chute, below the work surface. The drive mechanism is also mounted below the work surface, near to the strapping head. The drive mechanism urges or feeds the strap through the strapping head, into and around the chute, until the strap material returns to the strapping head to form a loop around the load. Essentially, the strap is pushed through the chute by the drive mechanism. After the strap loop has been formed, tension is applied to the strap to constrict the strap loop about the load and the overlapping strap ends are secured by conventional means to create a sealed, tensioned loop around the load.

Many such machines are employed in processes that maximize the use of fully automated strapping operations. To this end, machines are configured for automated in-feed and out-feed, such that a load to be strapped is automatically fed into the machine by an in-feed conveyor, the strapping process is carried out, and the strapped load is automatically fed out of the machine by an out-feed conveyor. As such, an improper strapping event, such as a strap short feed, wherein the strap does not create a full loop around the load, can create a "ripple effect" along the entire automated strapping process by forcing the shutdown of an entire strapping line. Thus, it is desirable to ensure that the occurrence of any such improper strapping events is minimized.

One of the primary causes of improper strapping events is a strap short feed. A strap short feed occurs, as discussed above, when the strap does not create a full loop around the load. Strap short feeds may be caused by areas along the strap travel path that snag the leading edge of the strap or otherwise cause the strap to gather or bunch. Such areas include the interface between horizontal and vertical sections of the chute and the interface between the chute and the strapping head.

To help avoid strap short feeds, it is desirable that the strap material exhibit a desirable degree of longitudinal stiffness, such that strap's leading edge remains generally parallel to the direction of travel (for example, the strap does not bow or sag downward to an unacceptable degree when traversing along horizontal portions of the chute) and such that the strap resists twisting, snagging or bunching as the strap travels through the chute. However, most prior art plastic straps exhibit only moderate levels of longitudinal stiffness due to the inherent physical properties of the plastic materials used to form such straps, and the desire to manufacture such straps with minimal thickness and weight.

To achieve desired increased longitudinal stiffness, many prior art plastic straps are formed with increased thickness and, thus, increased weight. However, it would be advantageous to obtain the desired longitudinal stiffness while decreasing the thickness and weight of the strap material. It is also advantageous to provide a strap that does not twist or take a helical-like form as it traverses through the strap chute.

Accordingly, there is a need for a plastic strap with enhanced longitudinal stiffness that resists snagging or bunching during travel around the chute of a strapper. Desirably, such a strap includes at least one integrated, longitudinally disposed rib for enhancing the stiffness of the strap. More desirably, such a strap is formed with side panels that are parallel to the longitudinal plane of the strap such that the strap does not twist. Most desirably, such as strap is formed with decreased relative thickness and weight as compared to prior art plastic straps offering comparable longitudinal stiffness.

BRIEF SUMMARY OF THE INVENTION

The present invention concerns a plastic strap formed with an integrated, longitudinally disposed rib for enhancing the stiffness of the strap while permitting the thickness and weight of the strap to be reduced. Such a strap is particularly useful for automated strapping machines.

In the preferred embodiment, the strap of the present invention is formed with at least one rib extending longitudinally from a first end of the strap to a second end of the strap. The rib preferably extends upwardly from the top surface of the strap and comprises a slight arcuate profile in the preferred embodiment. However, the profile of the rib may vary depending upon the desired longitudinal stiffness of the strap and the desired width and thickness of the strap, and may comprise a semi-circular, squared, rectangular or other shaped profile. Any desired rib profile may be used as long as the profile of the rib serves to increase the cross section of the strap, thereby imparting additional longitudinal stiffness.

Additionally, the number ribs may vary depending upon the desired longitudinal stiffness of the strap, the width of the strap and/or the thickness of the strap. In the preferred embodiment the strap includes a single rib disposed in the center of the strap. However, the strap may include a single rib, or three or more ribs, if desired. For example, in a second preferred embodiment, the strap includes two identical ribs disposed adjacent to one another in a parallel relationship. The ribs may be centered on the strap or, preferably, offset.

Significantly, and quite differently from the prior art, the strap further comprises side panels that are parallel to the longitudinal plane of the strap and side (outer) edges that are perpendicular to the longitudinal plane of the strap. That is, the areas of the strap between the rib(s) and the outer edges of the strap are generally flat and parallel with respect to the longitudinal plane of the strap, with the edges of the strap formed generally perpendicular to the longitudinal plane of the strap. Such a strap geometry advantageously permits the strap to fit and travel through many prior art strapper chute designs. Additionally, such a configuration reduces the tendency and/or opportunity for the strap to twist, and permits overlapping sections of the strap to interlock and self-align, a beneficial feature that may improve the efficiency of the strap sealing process.

In the preferred embodiment, the rib is formed after the strap is extruded (using techniques generally known to those skilled in the art), but before the strap has fully cooled. The rib is formed by passing the heated strap through a rolling mechanism configured to form the desired rib profile in the strap while exerting compressive forces against the side panels to maintain the side panels in a generally parallel relationship with the longitudinal plane of the strap 1, and to maintain the outer edges in a generally perpendicular relationship with the longitudinal plane of the strap.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
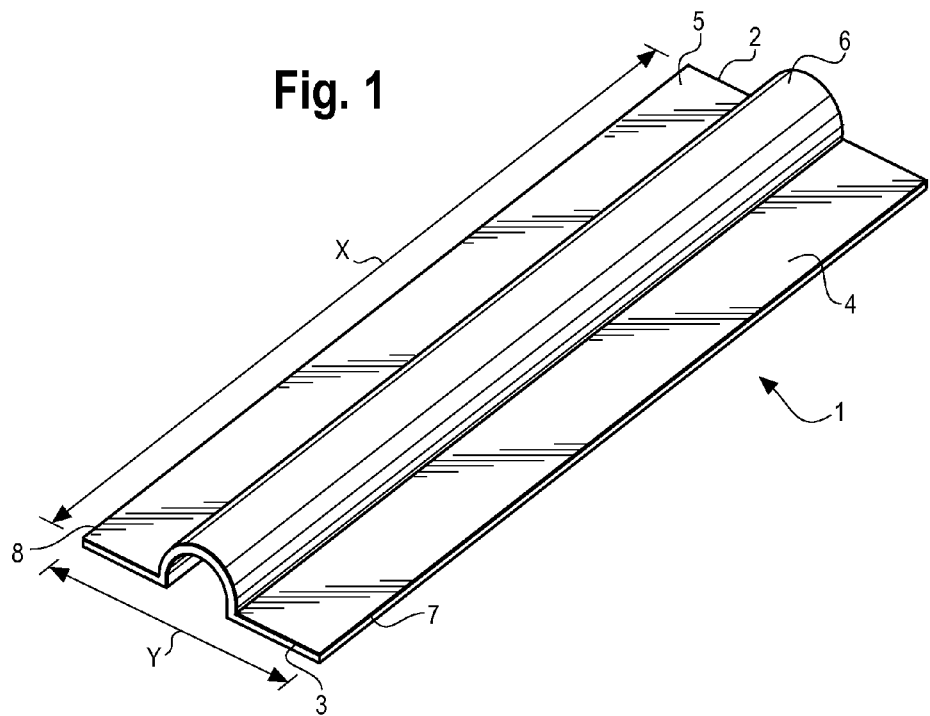
FIG. 1 is a perspective view of the strap with enhanced stiffness of the present invention in a first embodiment with a single rib having an arcuate profile.

While the present invention is susceptible of embodiment in various forms, there are shown in the drawings and will hereinafter be described several preferred embodiments with the understanding that the present disclosure is to be considered an exemplification of the invention and is not intended to limit the invention to the specific embodiments illustrated.

It should be further understood that the title of this section of the specification, namely, "Detailed Description of the Invention," relates to a requirement of the United States Patent and Trademark Office, and does not imply, nor should be inferred to limit the subject matter disclosed herein.

As shown in FIG. 1, strap 1 comprises a generally thin, rectangular strip of flexible plastic material configured to be disposed about a load, tensioned and sealed. The composition of strap 1 is well known to those skilled in the art and may comprise any number of plastic materials of sufficient strength and flexibility. It will be appreciated, however, that it is desirable that such straps not only be strong and flexible, but also lightweight so as to only minimally impact the overall weight of the strapped load.

Strap 1 comprises a leading edge 2 and a trailing edge 3 forming a length x of strap 1. It should be understood that length x of strap 1 will vary depending upon the size of the load to the strapped. Strap 1 further comprises a first outer edge 7 and a second outer edge 8 forming a width y of strap 1. It should be understood that width y of strap 1 may vary depending upon the size of the load to be strapped and the desired strength of strap 1.

Additionally, strap 1 comprises an integrated rib 6. Rib 6 is disposed longitudinally along strap 1, from leading edge 2 to trailing edge 3, and extending upwardly therefrom. Rib 6 is disposed between first outer edge 7 and second outer edge 8, and is preferably aligned along the central longitudinal axis of strap 1. However, in other embodiments rib 6 may be offset from the central longitudinal axis of strap 1.

Figure 2:
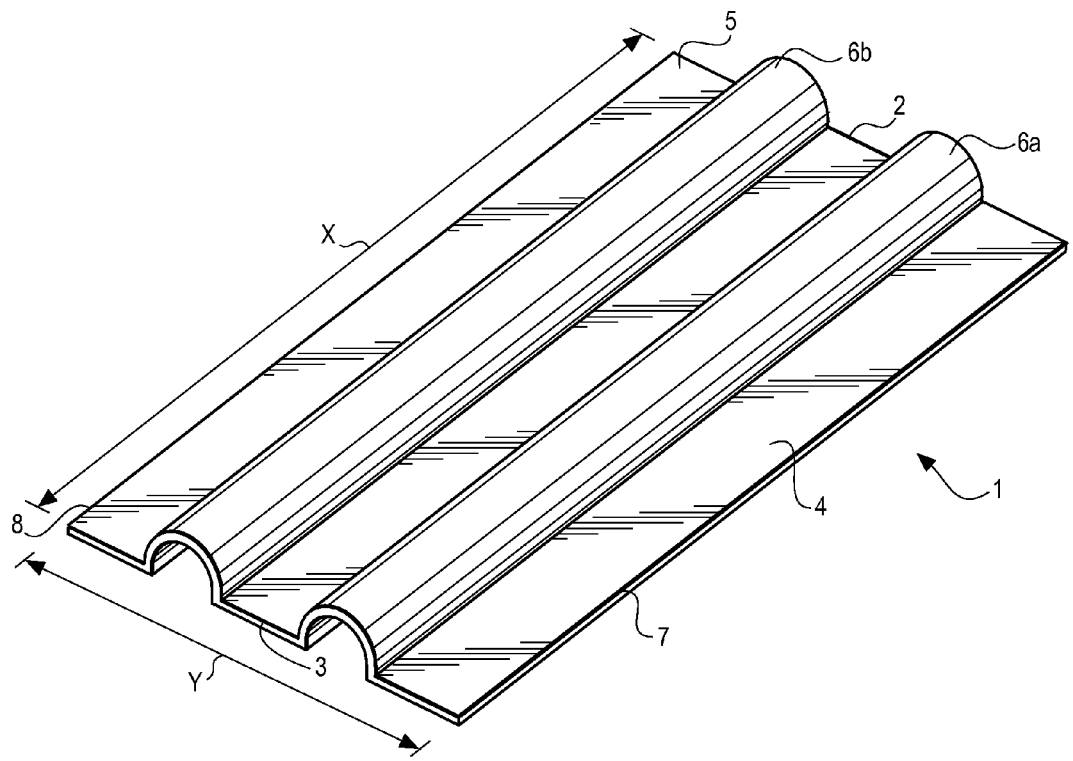
FIG. 2 is a perspective view of the strap with enhanced stiffness of the present invention in a second embodiment with a two ribs having arcuate profiles.
Figure 4:
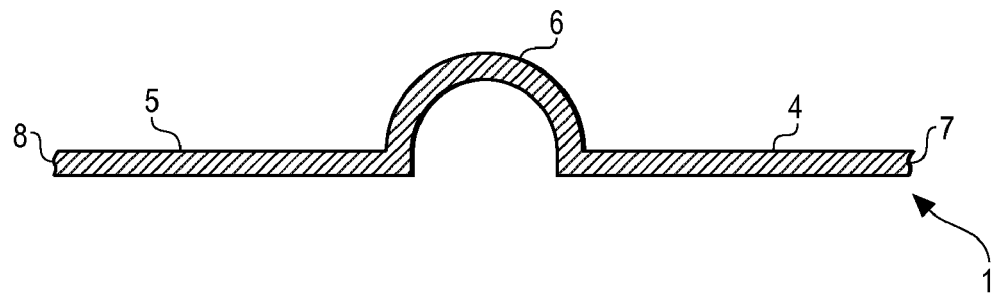
FIG. 4 is a cross-sectional front view of the strap with enhanced stiffness of the present invention in a first embodiment with a single rib having an arcuate profile.
Figure 5:
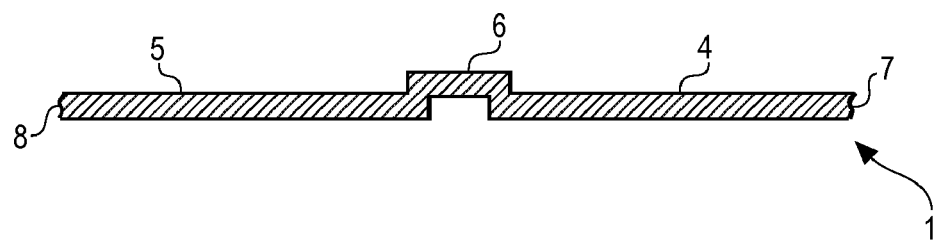
FIG. 5 is a cross-sectional front view of the strap with enhanced stiffness of the present invention in a first embodiment with a single rib having a square profile; and, FIG. 6 is a cross-sectional front view of the opposed dies that may be used to form the strap shown in FIG. 2.

As shown in FIGS. 1 and 4, rib 6 comprises a slight arcuate profile in a first preferred embodiment. However, it will be appreciated that the profile of rib 6 may vary depending upon the desired longitudinal stiffness of the strap and the desired width and thickness of the strap. For example, as shown in FIG. 5, rib 6 may comprise a semi-squared profile. Other profiles include semi-circular and semi-rectangular profiles. Any desired rib profile may be used as long as the profile of rib 6 serves to increase the cross section of strap 1, thereby imparting additional longitudinal stiffness. Furthermore, the height and width of rib 6 may vary depending upon the desired longitudinal stiffness of the strap and the desired width and thickness of the strap In a first preferred embodiment, as shown in FIGS. 1, 4 and 5, strap 1 includes a single rib 6. However, in other embodiments of strap 1, the number of ribs may vary depending upon the desired longitudinal stiffness of strap 1, the width of strap 1 and/or the thickness of strap 1. For example, as shown in FIG. 2, in a second preferred embodiment, strap 1 includes two identical ribs, 6a and 6b, disposed adjacent to one another in a parallel relationship, and both extending upwardly from strap 1. Ribs 6a and 6b both are disposed between first outer edge 7 and second outer edge 8 of strap 1 and, preferably, are disposed about and equidistant from the central longitudinal axis of strap 1. However, in other embodiments of the present invention, ribs 6a and 6b may be disposed about the central longitudinal axis of strap 1 and at different distances from the central longitudinal axis of strap 1.

Figure 3:
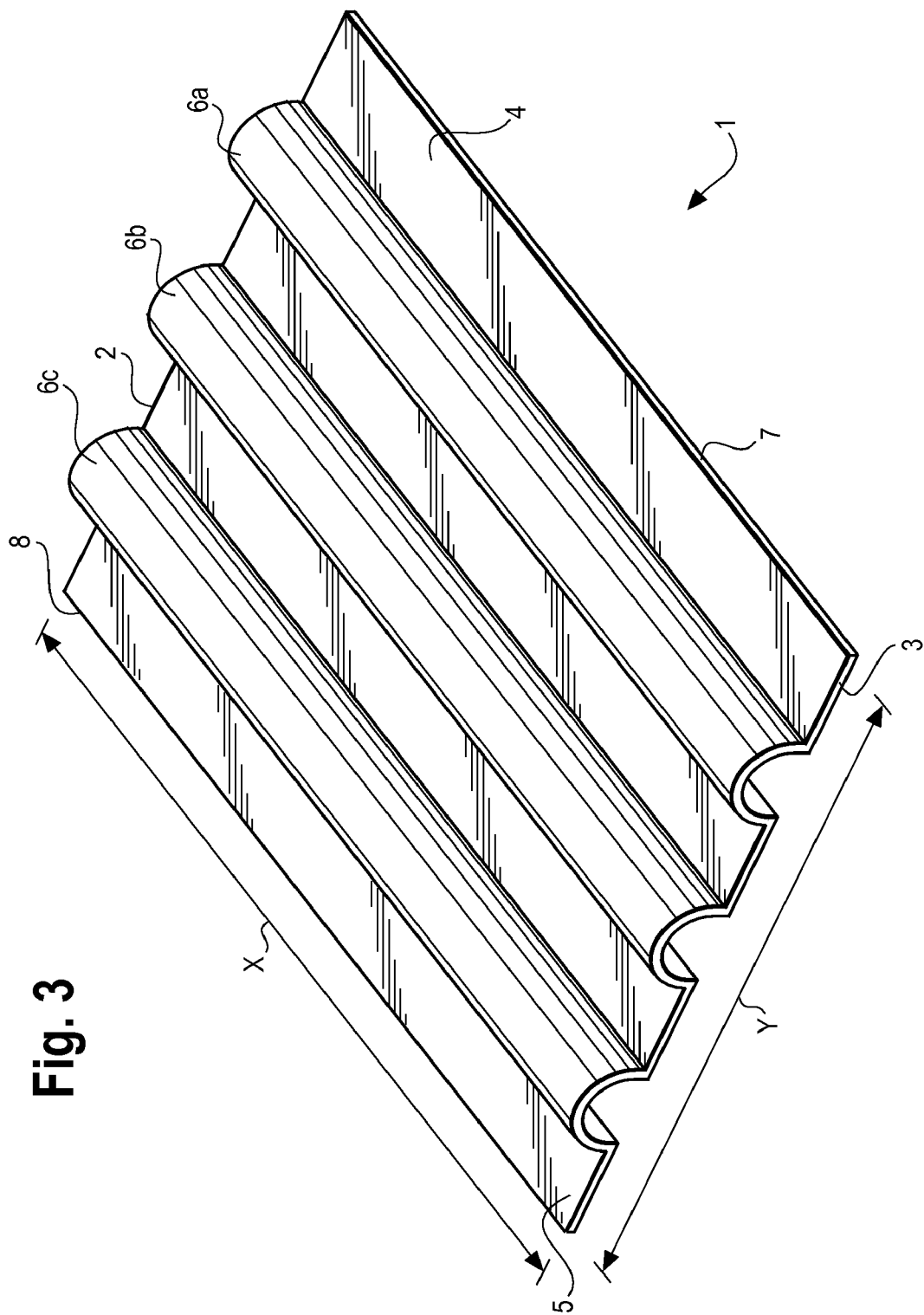
FIG. 3 is a perspective view of the strap with enhanced stiffness of the present invention in a third embodiment with three ribs having arcuate profiles.

Additionally, as shown in FIG. 3, a third preferred embodiment of strap 1 includes three identical ribs, 6a, 6b and 6c, disposed adjacent to one another in a parallel relationship and each extending upwardly from strap 1. Ribs 6a, 6b and 6c are disposed between first outer edge 7 and second outer edge 8 of strap 1 and, preferably, are disposed equidistant from each other. In one embodiment, central rib 6b may be disposed above the central longitudinal axis of strap 1, with ribs 6a and 6c disposed on opposing sides of and equidistant from central rib 6b. On other embodiments, central rib 6b may be offset from the central longitudinal axis of strap 1, with ribs 6a and 6c proportionally offset. In further embodiments, ribs 6a and 6c may be disposed on opposing sides of central rib 6b, but non-equidistant from central rib 6b.

However, in all embodiments of the present invention, strap 1 further comprises first side panel 4 and second side panel 5 disposed between rib 6 (or ribs 6a, 6b and/or 6c) and first outer edge 7 and second outer edge 8, respectively. First side panel 4 and second side panel 5 are formed to be generally flat and parallel to the longitudinal plane of strap 1. Further, first outer edge 7 and second outer edge 8 are formed generally perpendicular to the longitudinal plane of strap 1. Such a geometry advantageously permits strap 1 to retain the generally flat, rectangular shape associated with prior art strap designs, and allows strap 1 to fit and travel through many prior art strapper chute designs. Additionally, such a geometry prevents strap 1 from twisting (taking a helical-like profile), and permits overlapping sections of strap 1 to interlock and self-align, a beneficial feature that may improve the efficiency and effectiveness of the strap sealing process.

Figure 6:
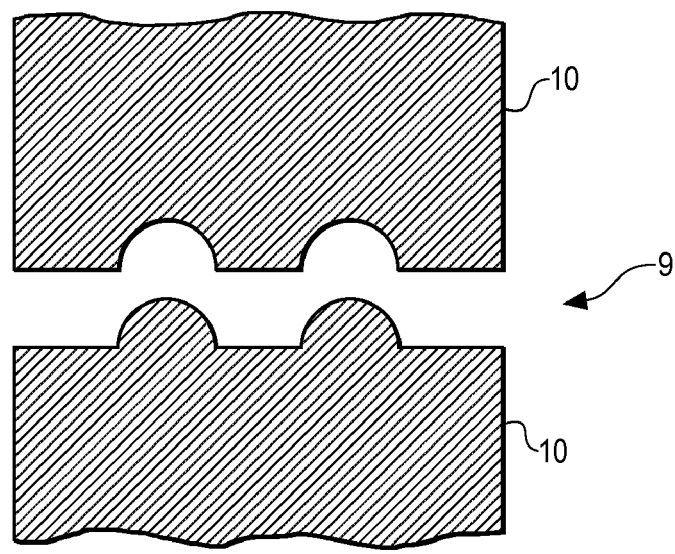

In the preferred embodiment, rib 6 (or ribs 6a, 6b and/or 6c) is formed in strap 1 after strap 1 is extruded and while strap 1 is still hot and formable. The extrusion methods for forming strap 1 are well known to those skilled in the art. Shortly after strap 1 is extruded, in the preferred embodiment strap 1 is passed through a rolling mechanism 9 (shown in FIG. 6) configured to form the desired profile of rib 6 in strap 1. Such rolling mechanisms are known to those skilled in the art of forming extruded materials.

In the present invention, the rolling mechanism 9 consists of opposed dies 10 configured to form in strap 1 the desired number of ribs having the desired rib profile, but also configured to exert compressive forces against first side panel 4 and second side panel 5 to maintain first side panel 4 and second side panel 5 in a generally parallel relationship with the longitudinal plane of strap 1, and to maintain first outer edge 7 and second outer edge 8 in generally perpendicular relationship with the longitudinal plane of strap 1, while rib 6 (or ribs 6a, 6b and/or 6c) is being formed. In some embodiments, a plurality of straps 1 may be formed within a larger piece of extruded plastic material and then cut to form individual straps.

Samples of straps manufactured in accordance with the present invention and samples of prior art straps of comparable composition and dimensions (width, thickness and length) were tested for stiffness. The prior art strap exhibited 564 grams of stiffness. A strap of the present invention comprising a single rib exhibited 1161 grams of stiffness, a 114% increase over the stiffness of the prior art strap. A strap of the present invention comprising two ribs exhibited 1128 grams of stiffness, a 108% increase over the stiffness of the prior art strap.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

What is claimed is:

1. A plastic strap comprising:
   a leading edge and a trailing edge defining a length of the strap;
   a first outer edge and second outer edge defining a width of the strap;
   an upper surface and a lower surface defining a thickness of the strap;
   a first side panel disposed adjacent to the first outer edge and a second side panel disposed adjacent to the second outer edge;
   at least two ribs extending longitudinally from the leading edge of the strap to the trailing edge of the strap, wherein the at least two ribs are disposed between the first side panel and the second side panel; and
   an intermediate region between the at least two ribs,
   wherein the first side panel and the second side panel define a longitudinal plane of the strap wherein the thickness of the strap, across a cross-section of the strap, including the first and second side panels and the rib, is substantially constant, and wherein the ribs extend above and/or below the longitudinal plane of the strap, the first and second side panels being planar and wherein each the first side panel, the second side panel, the intermediate region and a juncture of each rib with its respective side panel and a juncture of each rib with the intermediate region is without openings or notches.

2. The plastic strap of claim 1 wherein the at least two ribs each have an arcuate profile.

3. The plastic strap of claim 2 wherein the arcuate profile is semi-circular.

4. The plastic strap of claim 1 wherein the at least two ribs have a non-arcuate profile.

5. The plastic strap of claim 4 wherein the at least two ribs have a semi-square profile.

6. The plastic strap of claim 4 wherein the at least two ribs have a semi-rectangular profile.

7. The plastic strap of claim 1 wherein the at least two ribs extend upwardly from the strap.

8. The plastic strap of claim 1 wherein the at least two ribs are disposed in a parallel relationship.

9. The plastic strap of claim 1 including a third rib disposed in a parallel relationship to the at least two ribs.

10. The plastic strap of claim 1 wherein one rib is disposed about a central longitudinal axis of the strap.

11. The plastic strap of claim 1 wherein one rib is offset from a central longitudinal axis of the strap.

12. The plastic strap of claim 1 wherein the strap is formed by extrusion.

13. The plastic strap of claim 12 wherein the at least the at least two ribs are formed by a die while the strap is still hot.

14. A plastic strap comprising:
   a leading edge and a trailing edge forming a length of the strap;
   a first outer edge and second outer edge forming a width of the strap;
   a first side panel disposed adjacent to the first outer edge and a second side panel disposed adjacent to the second outer edge;
   a first rib extending longitudinally from the leading edge of the strap to the trailing edge of the strap;
   a second rib extending longitudinally from a leading edge of the strap to the trailing edge of the strap and parallel to the first rib; and
   an intermediate region between the first and second ribs,
   wherein the first rib is disposed between the first side panel and the second rib and the second rib is disposed between the second side panel and the first rib, and wherein the first side panel and the second side panel define a longitudinal plane of the strap, wherein a thickness of the plastic strap is substantially constant across a width of the strap, wherein the first outer edge and the second outer edge are perpendicular to the longitudinal plane of the strap, and wherein the first and second side panels are planar and wherein each the first side panel, the second side panel, the intermediate region and a juncture of each ribs with its respective side panel and a juncture of each rib with the intermediate region is without openings or notches.

15. The strap of claim 14 wherein at least one of the first rib or the second rib comprises an arcuate profile.

16. The strap of claim 14 wherein at least one of the first rib or the second rib extends upwardly from the strap.

17. The strap of claim 14 wherein the first rib and the second rib are equidistant from a central longitudinal axis of the strap.

18. The strap of claim 14 wherein the first rib and the second rib are non-equidistant from a central longitudinal axis of the strap.

19. A method for manufacturing a plastic strap comprising the steps of:

extruding a plastic material in the shape of a strap; and, forming at least two ribs in the strap while the strap is still hot, the strap including a leading edge and a trailing edge forming a length of the strap, a first outer edge and second outer edge forming a width of the strap, a first side panel disposed adjacent to the first outer edge, a second side panel disposed adjacent to the second outer edge, and an intermediate region between the at least two ribs, the at least two ribs extend longitudinally from the leading edge of the strap to the trailing edge of the strap, the at least two ribs disposed between the first side panel and the second side panel the first side panel and the second side panel defining a longitudinal plane of the strap, the first outer edge and the second outer edge being perpendicular to the longitudinal plane of the strap, and wherein a thickness of the strap is substantially constant across a width of the strap, including the at least two ribs and the first and second side panels, and wherein the first and second side panels are formed planar and wherein each the first side panel, the second side panel, the intermediate region and a juncture of each rib with its respective side panel and a juncture of each rib with the intermediate region is formed without openings and notches.

20. The method for manufacturing a plastic strap of claim 19 wherein the step of forming at least one rib in the strap while the strap is still hot further comprises exerting compressive forces against the first side panel and second side panel to maintain the first side panel and the second side panel in a generally parallel relationship with a longitudinal plane of the strap, and to maintain the first outer edge and the second outer edge in a generally perpendicular relationship with the longitudinal plane of the strap.

* * * * *

UNITED STATES PATENT AND TRADEMARK OFFICE
CERTIFICATE OF CORRECTION

Page 1 of 1

PATENT NO. : 8,015,671 B2
APPLICATION NO. : 11/680352
DATED : September 13, 2011
INVENTOR(S) : Timothy B. Pearson, Wayne J. Thas and Manuel C. Enriquez It is certified that error appears in the above-identified patent and that said Letters Patent is hereby corrected as shown below:

On the Title Page, Item (74)
The firm name of the Attorney of Record appears as "Levenfield Pearlstein, LLC" and should read "Levenfeld Pearlstein, LLC".

Col. 6, line 42
The phrase "wherein the at least the at least two ribs" should read "wherein the at least two ribs".

Signed and Sealed this
Seventeenth Day of April, 2012

David J. Kappos
*Director of the United States Patent and Trademark Office*